US006599168B1

United States Patent
Weaver

(10) Patent No.: US 6,599,168 B1
(45) Date of Patent: Jul. 29, 2003

(54) TWO FINGER TURKEY CALL

(76) Inventor: Mark H. Weaver, 1509 Strauss Valley Dr., Weissport, PA (US) 18235

( * ) Notice: Subject to any disclaimer, the term of this patent is extended or adjusted under 35 U.S.C. 154(b) by 0 days.

(21) Appl. No.: 10/177,369

(22) Filed: Jun. 19, 2002

(51) Int. Cl.[7] .................................................. A63H 5/00
(52) U.S. Cl. ....................................... 446/397; 446/418
(58) Field of Search ................................ 446/397, 418; D10/119

(56) References Cited

U.S. PATENT DOCUMENTS

| | | | | |
|---|---|---|---|---|
| 651,752 A | * | 6/1900 | Draughon | 446/397 |
| 3,129,527 A | * | 4/1964 | Williams | 446/397 |
| 3,208,184 A | | 9/1965 | Wisor | |
| 4,041,639 A | | 8/1977 | Funk | |
| 4,310,986 A | | 1/1982 | Jacobs | |
| 4,606,733 A | * | 8/1986 | Willis | 446/397 |
| 4,648,852 A | | 3/1987 | Wingate | |
| D296,880 S | | 7/1988 | Morocco | |
| 4,836,822 A | * | 6/1989 | Finley et al. | 446/397 |
| 4,854,914 A | * | 8/1989 | White, Jr. | 446/397 |
| 4,955,845 A | * | 9/1990 | Piper | 446/397 |
| 5,503,585 A | * | 4/1996 | Heineman | 446/397 |
| 6,071,172 A | * | 6/2000 | Pate | 446/397 |
| 6,159,068 A | | 12/2000 | Trotter | |

OTHER PUBLICATIONS

Internet: http://www.cannoncountry.com, Cannon Country Game Calls, Inc., Friction Calls, 2003.*
Internet: http://www.turkeyhuntingsecrets.com, Friction Calls Department, 2003.*

* cited by examiner

Primary Examiner—Derris H. Banks
Assistant Examiner—Urszula Cegielnik
(74) Attorney, Agent, or Firm—Gene Scott-Patent Law & Venture Group

(57) ABSTRACT

A turkey call apparatus includes a first portion with a slate pad mounted on a backing panel, which is mounted on an index finger using an elastic band. A second, U-shaped portion has a base integral with spaced apart legs, the terminal edges of which support felt strips. A striker is engaged with the base and positioned between the legs for contact between a free end of the striker and the slate pad when it is moved across the felt strips in a back-and-forth motion. A second elastic band is adapted for engaging a thumb so that the apparatus may be used with only one hand.

1 Claim, 1 Drawing Sheet

TWO FINGER TURKEY CALL

BACKGROUND OF THE INVENTION

1. Incorporation by Reference

Applicant(s) hereby incorporate herein by reference, any and all U.S. patents, U.S. patent applications, and other documents and printed matter cited or referred to in this application.

2. Field of the Invention

This invention relates generally to game calling devices and more particularly to a turkey call able to be operated in the field using only one hand.

3. Description of Related Art

The following art defines the present state of this field:

Morocco, U.S. Pat. No. Des. 296,880 describes a gun mounted turkey call design.

Wisor, U.S. Pat. No. 3,208,184 describes a turkey caller comprising a first part adapted to be held in one hand of the user, said first part comprising a body which is cylindrical in cross-section, has its upper end reduced to define a marginally encompassing ledge, which has its axial portion bored and then axially counterbored, the counterbore being restricted in cross-section and extending from the bottom of the bore through the bottom of the body and providing a socket, the major portion of said bore constituting a clearance space, an insertable and removable vibratory peg having a lower end portion adjustably and removably friction fitted in. said socket and its major portion extending upwardly through and beyond said bore and above the top of said body portion, and a complemental Part for use in association with and physically attached to said first-named part and adapted to be held in the user's other hand and being hollow and providing a sound wave amplifying chamber and being further provided with a built-in slate, said slate constituting an anvil. with which the free tip end of said peg can be cooperatively coordinated when being used.

Funk, U.S. Pat. No. 4,041,639 describes a game call having a strike plate mounted in a box and a sounding block held in a stiffly resilient sound-insulating strip moveable back and forth across the top of the box to move the striking point of the peg in the block across the plate and thereby generate a game call. The strip holds the sounding block in a less than 90 degree angular orientation with respect to the plate and at a desired level above the plate. The block and strip may fit together in a manner whereby the block can be removed and can be turned about the peg long axis to equalize wear on the peg end.

Jacobs, U.S. Pat. No. 4,310,986 describes a game call having a sounding board covering the sounding chamber of a sound block to facilitate in the production of tones imitating the call of a wild turkey. The call is composed of two sections interfitted so that the vibratory peg extending from the sound block rests securely on a groove machined on the front and of the sound box for compact carrying and protection from damage.

Wingate, U.S. Pat. No. 4,648,852 describes a turkey call which includes as a first element, a rectangular call box open at one end to define an internal sound chamber and constructed of cedar side and end strips, a formica cap and base and a slate plate located on the cap and coextensive in size with the sound chamber. A striker is provided as a second element and includes a solid plastic striker tip attached to a handle, and the handle is further characterized by a handle sound chamber which communicates with the plastic striker tip by means of an interior plenum. The striker tip is bevelled at the extending end, with the bevel terminating in a rounded tip end for engaging the slate striker plate on the call box and simultaneously emitting sounds from the call box sound chamber and striker sound chamber to simulate the call of a wild turkey.

Trotter, U.S. Pat. No. 6,159,068 describes a turkey call comprising a substantially oval shaped, partially hollow body of wood or other suitable material, open on one long side to form a sound chamber, the exposed edges of the opening forming an effective striking surface; and an elongated striker made of wood or other suitable material having one face at least partially treated with a substance to increase the frictional properties of the striker when it contacts the sound chamber.

The prior art teaches game calls of various types, but does not teach a turkey call with the structure of the instant invention capable of being construction inexpensively and used by one hand alone. The present invention fulfills these needs and provides further related advantages as described in the following summary.

SUMMARY OF THE INVENTION

The present invention teaches certain benefits in construction and use which give rise to the objectives described below.

A turkey call apparatus includes a first portion with a slate pad mounted on a backing panel, for mounting on an index finger using a first elastic band. A second, U-shaped portion, has a base integral with spaced apart legs the terminal edges of which support felt strips. A striker is engaged with the base and positioned between the legs for contact between a free end of the striker and the slate pad when the slate pad is moved across the felt strips in a back-and-forth motion. A second elastic band is adapted for engaging a thumb of the same hand so that the apparatus may be used with only one hand.

A primary objective of the present invention is to provide an apparatus and method of use of such apparatus that provides advantages not taught by the prior art.

Another objective is to provide such an invention capable of calling turkeys.

A further objective is to provide such an invention capable of being manipulated by one hand.

A still further objective is to provide such an invention capable of being manufactured inexpensively.

Other features and advantages of the present invention will become apparent from the following more detailed description, taken in conjunction with the accompanying drawings, which illustrate, by way of example, the principles of the invention.

BRIEF DESCRIPTION OF THE DRAWINGS

The accompanying drawings illustrate the present invention. In such drawings.

DETAILED DESCRIPTION OF THE INVENTION

The above described drawing figures illustrate the invention in at least one of its preferred embodiments, which is further defined in detail in the following description.

Figure 1:
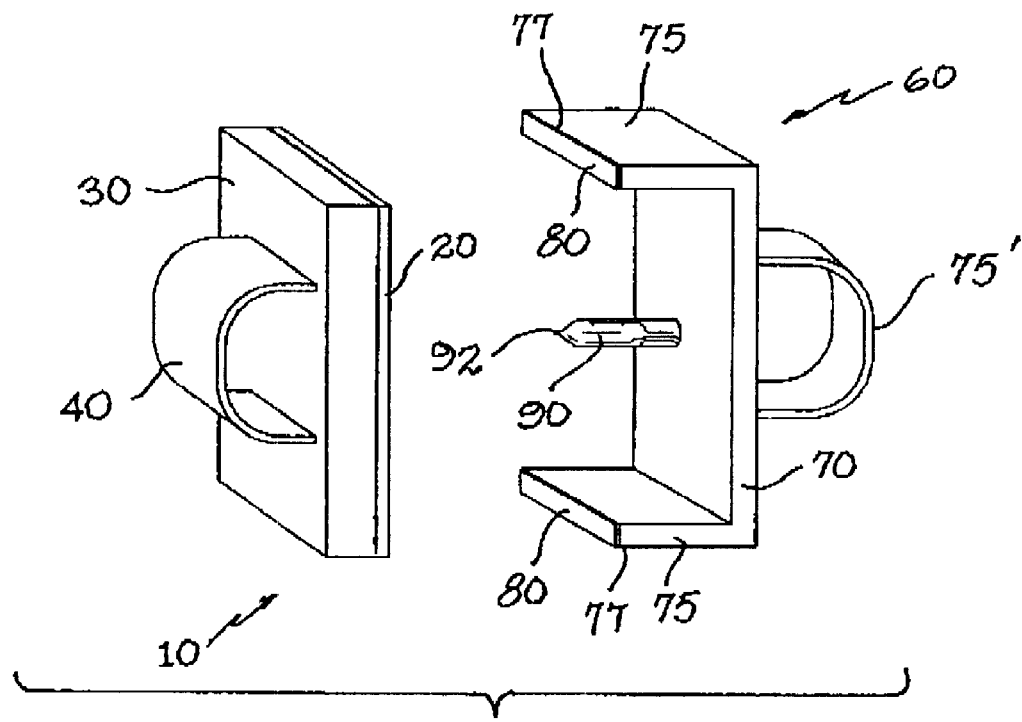
FIG. 1 is a perspective view of the preferred embodiment of the invention.
Figure 2:
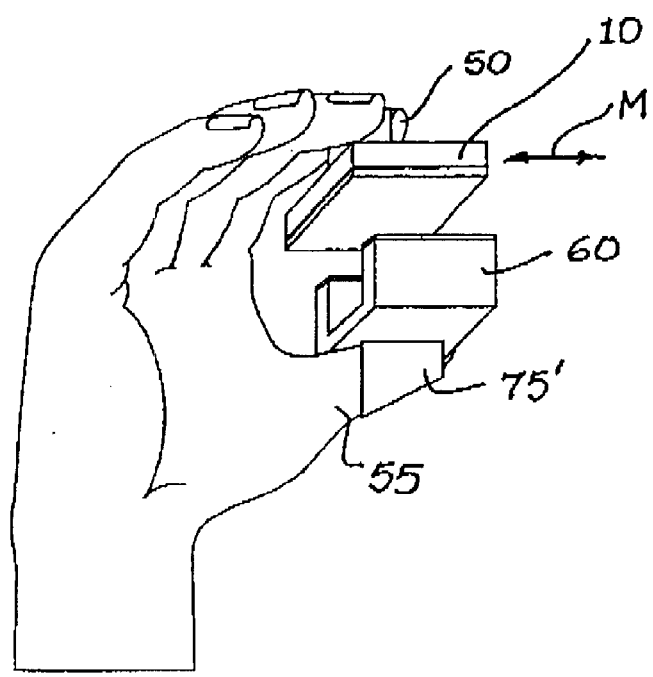
FIG. 2 is a further perspective view demonstrating usage thereof as mounted on fingers for one hand activation of the turkey call.

The present invention is a turkey call apparatus comprising the combination of a first portion 10 including a slate pad 20 mounted on a backing panel 30. The backing panel 30 provides a first elastic band 40 adapted for engaging an index finger 50 of a hand. A second, U-shaped portion 60 has a base 70 integral with spaced apart legs 75. Felt strips 80 are mounted on the terminal edges 77 of the spaced apart legs 75. A striker 90 is engaged with the base 70 and is positioned between the legs 75 for contact between a free end 92 of the striker 90 and the slate pad 20 when the slate pad 20 is moved across the felt strips 80 in a back-and-forth motion as shown by arrow "M" in FIG. 2, The base 70 provides a second elastic band 75' adapted for engaging a thumb 55. The backing panel 30 and the U-shaped portion 60 are preferably made of wood, plastic, metal or other similar material. The slate pad 20 and the felt strips 80 are preferably bonded to the respective parts to which they are attached any common and appropriate bonding agent. It is noted that the U-shape of the second portion provides for sound amplification through reverberation between the legs 75 and this is considered critical to the successful operation of the invention.

While the invention has been described with reference to at least one preferred embodiment, it is to be clearly understood by those skilled in the art that the invention is not limited thereto. Rather, the scope of the invention is to be interpreted only in conjunction with the appended claims.

What is claimed is:

1. A turkey call apparatus comprising in combination: a first portion including a slate pad mounted on a backing panel, the backing panel providing an elastic band adapted for engaging an index finger; a second, U-shaped portion having a base integral with a pair of spaced apart legs; a pair of felt strips mounted on a pair of terminal edges of the spaced apart legs, and a striker engaged with the base and positioned between the legs for contact between a free end of the striker and the slate pad when the slate pad is moved across the felt strips in a back-and-forth motion, the base providing a second elastic band adapted for engaging a thumb.

* * * * *